(12) United States Patent
Paggi

(10) Patent No.: US 9,915,242 B2
(45) Date of Patent: *Mar. 13, 2018

(54) ROOF RIDGE WIND TURBINE

(71) Applicant: TURBOROOF LLC, Port Clinton, OH (US)

(72) Inventor: Raymond E. Paggi, Winchester, VA (US)

(73) Assignee: TURBOROOF LLC, Port Clinton, OH (US)

( * ) Notice: Subject to any disclaimer, the term of this patent is extended or adjusted under 35 U.S.C. 154(b) by 595 days.

This patent is subject to a terminal disclaimer.

(21) Appl. No.: 14/031,566

(22) Filed: Sep. 19, 2013

(65) Prior Publication Data

US 2014/0017070 A1    Jan. 16, 2014

Related U.S. Application Data

(63) Continuation of application No. 12/624,483, filed on Nov. 24, 2009, now Pat. No. 8,545,298.

(60) Provisional application No. 61/105,096, filed on Nov. 24, 2008.

(51) Int. Cl.
  *F24F 7/02* (2006.01)
  *F03D 3/00* (2006.01)

(52) U.S. Cl.
  CPC ........ *F03D 3/002* (2013.01); *F05B 2240/911* (2013.01); *Y02B 10/30* (2013.01); *Y02E 10/728* (2013.01); *Y02E 10/74* (2013.01)

(58) Field of Classification Search
  CPC ....................................... F24F 7/02

USPC ................................. 454/364, 365
  See application file for complete search history.

(56) References Cited

U.S. PATENT DOCUMENTS

| | | | |
|---|---|---|---|
| 3,143,953 A | 8/1964 | Bristol | |
| 5,112,278 A | 5/1992 | Roberts | |
| 6,159,093 A * | 12/2000 | Mihalko, III | 454/341 |
| 8,120,193 B2 | 2/2012 | Nightingale | |
| 2007/0264116 A1 | 11/2007 | Dempster | |

* cited by examiner

*Primary Examiner* — Helena Kosanovic
(74) *Attorney, Agent, or Firm* — Welsh Flaxman & Gitler LLC

(57) ABSTRACT

Disclosed are systems and method that generally relate to the capture of wind energy by small wind turbines mounted on buildings with gabled roofs. Wind energy harnessing system for gabled roof buildings having a roof ridge including a low silhouette visually appealing enclosure mounted along the roof ridge of a building and extending down both sides of the roof forming the ridge. The enclosure includes airflow guides defined by columns extending down a length of both sides of the building roof forming sidewalk and a roof formed of pivoting louvers above the columns. A paddle-wheel type wind turbine consists of a multiple-bladed cylindrical shaft that contacts the wind and provides rotational work mounted within the enclosure and a generator connected to the wind turbine for converting the rotational work from the wind turbine to electrical energy. The enclosure for the wind turbine functions to capture wind and directs the airflow via the airflow guides before it reaches the ridge.

6 Claims, 3 Drawing Sheets

ROOF RIDGE WIND TURBINE

CROSS REFERENCE TO RELATED APPLICATION

This application is a continuation of U.S. patent application Ser. No. 12/624,483, filed Nov. 24, 2009, entitled "ROOF RIDGE WIND TURBINE", now U.S. Pat. No. 8,545,298 and claims the benefit of U.S. Provisional Patent Application Ser. No. 61/105,096, filed Nov. 24, 2008, entitled "ROOF RIDGE WIND TURBINE".

TECHNICAL FIELD

The present invention generally relates to small wind turbines. More particularly, the invention discloses systems that can be mounted along the ridge of a gabled roof building to capture wind energy and benefit from the wind deflected to the ridge by the sloped face of the roof.

BACKGROUND INFORMATION

Energy capture from the wind is not only a pollution-free resource, but also a means to help reduce dependence on foreign oil. Significant effort has been undertaken by government and industry on large wind turbine systems because of their intrinsic high efficiency. Considerably less attention has been focused on smaller wind systems that can be placed on the roofs of buildings. The reasons for this are many but typically include the unsightliness of large blade wind turbines, the noise generated by these wind turbines, the vibration imparted to the roof structure and the hazards to birds.

There remains a need for a small wind turbine device for homes, commercial buildings, barns, and storage sheds that can capture the benefits of the increased wind speed produced by gabled roof buildings that are also not visually or audibly offensive. A gabled roof is a type of sloped roof in which the two halves of the roof meet to form a peak. There is also a need for wind power production right in the population centers that can reduce the line losses from remote wind turbine farms, eliminate the need for massive investment in new high voltage power lines and puts energy production in the hands of consumers.

Several systems have been disclosed as prior art that place the wind turbine on the ridge of gabled roofs to take advantage of the wind speed acceleration across the roof. These systems have serious flaws in the positioning of the wind turbine and in the design of the airflow channel, which significantly degrades potential performance. Recent studies conducted by the U.S. National Renewable Energy Laboratory (NREL), by Watson et al ("Estimating the Potential Yield of Small Building-mounted Wind Turbines") and Lubitz ("Effect of Roof Slope on a Building-Mounted Turbine") have provided a more comprehensive understanding of airflow across roofs.

US Patent Application Publication No. 2007/0258806 provides an excellent summary of wind turbine design, features, benefits and disadvantages. Several published patents including U.S. Pat. No. 6,948,905, U.S. Pat. No. 7,315,093, U.S. Pat. No. 7,276,809 and published applications including US Patent Application Publication 2007/0210585, US Patent Application Publication 2007/0176431 and US Patent Application Publication 2007/0098542 describe in detail wind turbines designed for roof mounting, all of which are hereby incorporated by reference in their entirety.

The present invention solves the flaws of previously disclosed devices and addresses the above needs.

SUMMARY

The present invention disclosure describes wind energy harvesting systems that can be mounted along the ridge of a gabled roof to take full advantage of the well known "roof effect" whereby the wind impacts the surface of the sloped lace of the gabled roof and deflects the airflow upwards towards the ridge, thus multiplying the wind speed. This effect is similar to air increasing in velocity over a wing, which lowers the air pressure above the wing according to Bernoulli's equation and thus provides lift to the wing. This effect also causes roofs to completely lift off houses in a hurricane.

The present invention comprises a wind turbine device enclosed within a low silhouette structure to bide the device from view and to make it visually appealing. The enclosure also prevents harm to birds and prevents snow accumulation on the device in cold localities. The enclosure also selves to capture the airflow before it encounters the stagnation point now known to occur at the peak of a gabled roof.

The system can be retrofitted to an existing sloped roof where it is mounted directly to the roof or it can be partially recessed into the roof of a new construction building to further improve wind energy capture and visual appeal.

DETAILED DESCRIPTION OF THE INVENTION

There is currently no wind turbine device available that can take full advantage of the wind power density multiplying effect of gabled roofs and that also has a low silhouette, is visually appealing, has a low noise output, and is not harmful to the roof structure or to birds flying in the area.

The wind harnessing system 10 of the present invention is comprised of: 1) a paddle-wheel type wind turbine 12 consisting of a multiple-bladed cylindrical shaft that contacts the wind and provides rotational work; 2) an alternator or generator 16 that converts the rotational work from the wind turbine 12 to electrical energy; 3) an enclosure 20 to make the unit visually appealing, non-harmful to birds and to prevent snow accumulation on the unit and to also contain and channel the airflow so that it avoids the stagnation point that naturally occurs at the peak of the roof.

Figure 1:
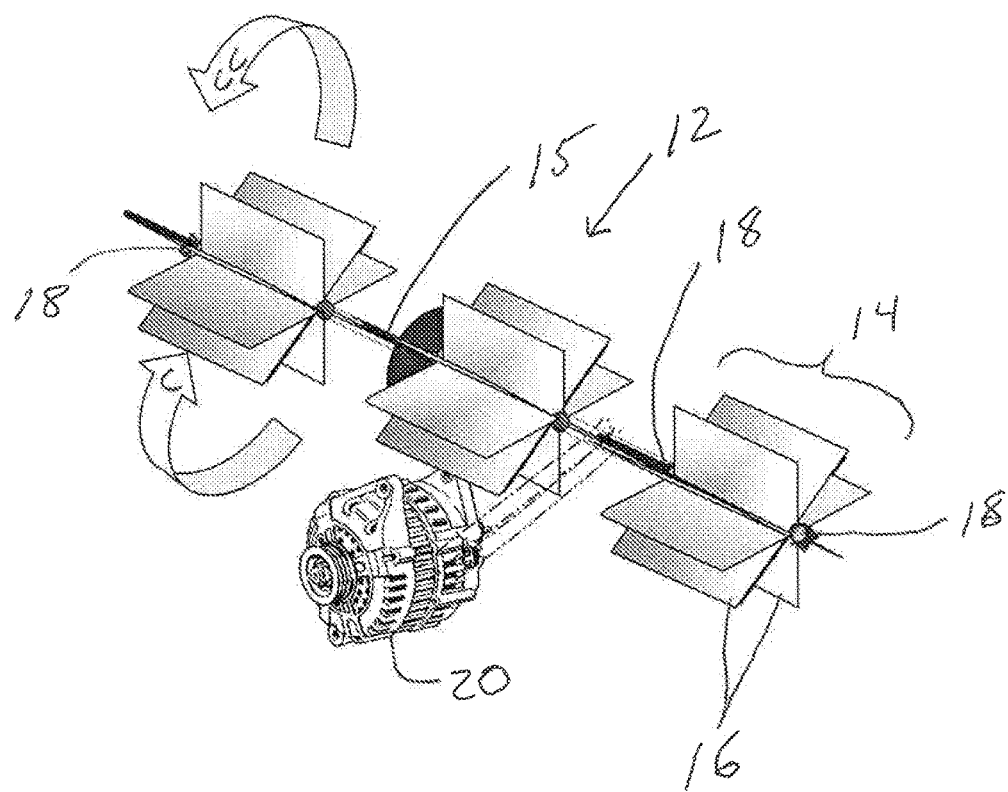
FIG. 1 is a schematic describing the wind turbine unit.

The wind turbine 12 is the core energy producer of the system. As shown in FIG. 1, the wind turbine 12 is a multiple segment device with each segment 14 comprising a cylindrical shaft 15 and plural blades 16. The shaft 15 ranges in diameter from one half inch to three inches and ranges in length from eight inches to four feet. Depending on the materials selected, whether durability, strength or cost is the highest priority, the cylindrical shaft 15 can be a solid core or a thick walled pipe. Two to seven turbine blades 16 are attached to the length of the shaft 15. The blades 16 can range in width from six inches to two feet but will optimally be about one foot to maintain a low roof top silhouette while providing an adequate windswept area. The blades 16 can be straight and flat-faced along the length of the shaft 15 or can be helically pitched. The blades 16 can also be fitted with tips to providing additional torque. The blades 16 of each segment 14 can be slightly offset from each other to provide smoother operation.

Figure 3:
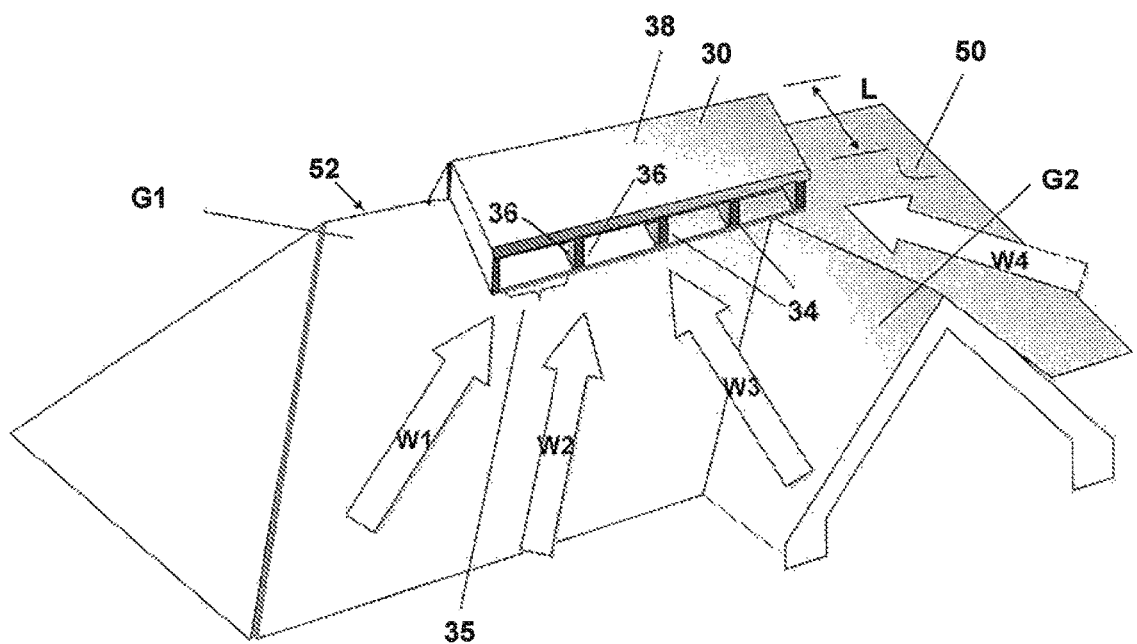
FIG. 3 is a schematic of an embodiment of the invention mounted on a roof ridge to describe the airflows on a sloped roof.

The wind turbine 12 is placed along the ridge 52 of the roof 50 with a journal bearing 18 mounted on each end and between segments to provide support along the roof 50. The wind turbine 12 can rotate in both directions to capture wind energy from both directions as indicted by the arrows C and CC in FIG. 1. The power output of this wind turbine is highest when the wind direction is orthogonal to the roof ridge. However, wind (W) can be collected from a 120-degree sweep along the sloped roof with diminished multiplication factors. This invention is designed to be low cost so a second wind turbine can be mounted on a counter-gabled roof where the gables are constructed orthogonally to each other as shown in FIG. 3 and labeled G1 and G2, allowing a full 360 degrees of potential wind energy conversion.

The wind turbine is constructed of multiple segments 14, which are placed in series with each other along the roof ridge 52. Each additional unit placed on the ridge increases power output not only by the additional swept area of the turbine blades 16 but also by the additional surface of the roof which accelerates and re-directs die airflow toward the turbine 12. The segments 14 can be made in lengths ranging from eight inches to two feet but optimally are about twenty-two inches so that the support bearings sit squarely on the roof rafters.

The wind turbine shaft 15 is connected to an alternator or a generator, pump, compressor of any other mechanical device 20 that can convert the rotational mechanical energy into electrical energy. An inverter, which is an off-the-shelf device, is utilized to change the frequency and voltage of the power output to that which can be used in the household or in the grid These wind turbines 12 are unique in that the blades 16 are long and have a large effective swept area, but yet are not visually obtrusive. This wind turbine 12 also has more blades 16 than a propeller type wind turbine and can thus provide more torque. The wind turbine 12 is also inherently low in noise output because it is not chopping through the air, as do propeller type wind turbine blades.

Figure 2:
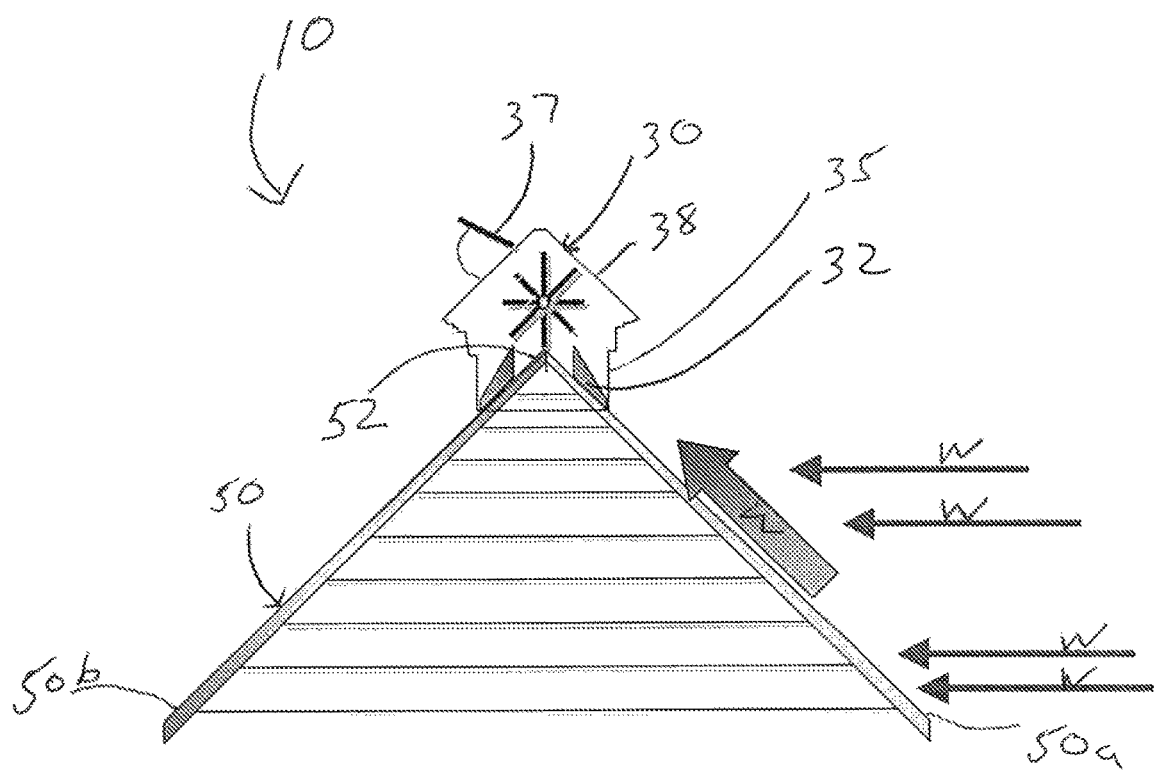
FIG. 2 is a side view schematic showing the wind turbine and embodiment of an enclosure.

The enclosure 30 for the system is not only a means to change wind turbines 12 from being visually offensive in a residential neighborhood to an architecturally appealing feature, but is an integral component of the entire system. As shown in FIG. 2, the enclosure 30 maintains a low silhouette on the roof 50 while incorporating airflow guides 35 and ramps 32 to direct the air towards the upward moving turbine blades. Louvers or grates (not shown) are fitted over the front and rear facing openings through which the airflow is captured to prevent intrusion from leaves, animals and any other object that can potentially damage or restrict the flow of the wind turbine 12. The enclosure frame is equipped with short support columns 34 which attach the cupola roof 38 to the main roof 50 and form the sidewalls 36 of airflow guides 35 as they extend down a length (L) of both sides of the roof 50 as best shown in FIG. 3. These columns 34 serve the additional purpose of straightening the airflow as the airflow contacts the columns 34, in particular sidewalls 36, and is straightened or directed to flow into the blades 16 of the wind turbine 12 from the various approach angles (W1, W2, W3, W4) up the roof as shown in FIG. 3. Due to enclosure 30 and specifically the columns 34, the wind is prevented from contacting the turbine 12 at numerous different angles resulting in improved wind capture.

The wind flow must be captured one to two feet down from the ridge to avoid the turbulence that occurs at the ridge when air moving directly across the roof collides with air coming up the sides of the roof. Therefore, it is desired to have the enclosure columns 34 extend down each side of the gabled roof 50 eighteen to twenty-four inches.

As shown in FIG. 2, the airflow guides 35 may optionally contain ramps 32 positioned immediately in front of the blades 16 of the wind turbine 12 to further direct and accelerate the airflow captured by the enclosure 30 upward onto the rotatable blades 16.

The wind turbine enclosure 30 comprises a frame 31 that surrounds the wind turbine 12 on four sides providing structural support, a means for entry 35 and exit 37 for the moving air, and a means 32, 34 to optimize the impingement of the airflow on the turbine blades 16. The frame 31 is formed by the columns 34 forming opposed sidewalls 36, the roof 50 of the building forming the bottom wall and the roof 38 of the cupola enclosure 30 forming the top wall.

The roof 38 of the enclosure 30 has hinged louvers 37, which release the air directed from the opposite side as shown in FIG. 2. That is, as shown in FIG. 2, the air travels up the roof on side 50a, and enters the enclosure 30 before the peak 52 of the roof 50 where it is straightened and directed into the blades 16 of the wind turbine 12, and exits via hinged louvers 37 on the opposite side. The louvers 37 pivot open when contacted by the exiting airflow. When no wind is traveling through the enclosure 30, the louvers sit flat as on roof side 50a. When wind is traveling through the enclosure 30, the wind lifts the louvers 37 off their seat (see roof side 50b) and is released from the enclosure 30.

The enclosure 30 provides the additional benefit of improving the attic ventilation of the building by allowing the ridge shingles to be removed and the hot air in the attic to escape up into the cupola and out into the environment. The system 10 can be retrofitted to an existing sloped roof where it is mounted directly to the roof (as shown in FIG. 2) or it can be partially recessed into the roof as shown in FIG. 3) of a new construction building to further improve wind energy capture and visual appeal.

Methods of Using the Invention

The present invention is a passive energy conversion device. No human intervention is required except for the replacement of parts and components that become worn over time. When wind is available, the wind contacts the roof 50 of the building. The air becomes denser as it piles up against the roof 50 and then follows the slope of the roof upwards toward the ridge 52. The air increases in speed by up to a factor of 3 depending on the slope of the roof 50 and the angle of the wind in contacting the roof 50. The air then enters the enclosure 30 before it reaches the peak 52 where it is directed by components, in particular sidewalk 36 of columns 34 form the airflow guides 35, of the enclosure 30 towards the upper turbine blades 16. The force of the air pushes against the blades 16 and rotates the wind turbine 12 around the shaft 15. The wind turbine shaft 15 is connected to the alternator, generator, compressor, pump or any other mechanical means 20 of converting the torque of the wind turbine shaft 15 to usable work. After pushing the blades 16 and rotating the shaft 15 of the wind turbine 12, the air exits the enclosure 30 through the hinged roof louvers 37.

Utility

The present invention is directed to the generation of electrical energy from the wind. The invention provides a means for individual homeowners, commercial building owners and government agencies that occupy buildings with gabled roofs to mount a wind turbine on the roof in a visually and audibly non-intrusive manner. The invention provides five to eight times the energy of an equivalent sized propeller type wind turbine not mounted on a gabled roof.

Example

Table 1, below shows the calculated wind energy available utilizing the roof ridge wind turbine. The performance of a 20-foot long roof ridge wind turbine with one-foot wide blades is compared to a tower mounted five-foot diameter propeller type wind turbine at a light wind speed of 10 miles per hour.

TABLE 1

Wind Turbine comparison

| | Wind Speed, Miles/hour | Swept Area, Sq. meters | Roof Effect Factor | Wind Energy Available, Watts |
|---|---|---|---|---|
| 5 ft diameter propeller type | 10 | 1.8 | 0 | 100 |
| Roof ridge type | 10 | 1.8 | 1 | 100 |
| Roof ridge type | 10 | 1.8 | 1.5 | 344 |
| Roof ridge type | 10 | 1.8 | 2 | 816 |
| Roof ridge type | 10 | 1.8 | 2.5 | 1595 |

Definitions

In this specification and in the claims that follow, reference will be made to a number of terms, which shall be defined to have the following meanings:

Throughout the description and claims of this specification the word "comprise" and other forms of the word, such as "comprising" and "comprises," means including but not limited to, and is not intended to exclude, for example, other components, integers, or steps.

"Optional" or "optionally" means that the subsequently described event or circumstance can or cannot occur, and that the description includes instances where the event or circumstance occurs and instances where it does not. For example, a statement about a device that optionally contains a roof refers to devices that have a roof and devices that do not have a roof.

Ranges can be expressed herein as from "about" one particular value, and/or to "about" another particular value. When such a range is expressed, another aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint. It is also understood that there are a number of values disclosed herein, and that each value is also herein disclosed as "about" that particular value in addition to the value itself. For example, if the value "10" is disclosed, then "about 10" is also disclosed. It is also understood that when a value is disclosed that "less than or equal to" the value, "greater than or equal to the value" and possible ranges between values are also disclosed, as appropriately understood by the skilled artisan. For example, if the value "10" is disclosed, then "less than or equal to 10" as well as "greater than or equal to 10" is also disclosed. It is also understood that throughout the application data is provided in a number of different formats and that this data represent endpoints and starting points and ranges for any combination of the data points. For example, if a particular data point "10" and a particular data point "15" are disclosed, it is understood that greater than, greater than or equal to, less than, less than or equal to, and equal to 10 and 15 are considered disclosed as well as between 10 and 15. It is also understood that each unit between two particular units are also disclosed. For example, if 10 and 15 are disclosed, then 11, 12, 13, and 14 are also disclosed.

Roof ridge is the peak of gabled roof where two side roofs are joined. The ridge beam connects the rafters or trusses together.

Wind power available (P) is defined as $P=0.5\,A\tilde{n}V^3$ where A is the swept area of the turbine blades, ñ is the air density at the current ambient temperature and pressure and V is the wind velocity.

Roof effect factor is defined as the actual wind speed of the roof divided by the wind speed of the undisturbed air.

Cupola is defined as a structure located on top of a larger roof often used to admit light and provide ventilation.

It is understood that the examples and embodiments described herein are for illustrative purposes only and that various modifications or changes in light thereof be suggested to persons skilled in the art and are to be included within the spirit and purview of this application and scope of the appended claims. All publications, patents, and patent applications cited herein are hereby incorporated by reference in their entirety for all purposes.

What is claimed is:

1. A wind energy harnessing system for buildings having a roof ridge with a longitudinal axis, comprising:
    an enclosure having a longitudinal axis, the enclosure mounted along a roof ridge of a building and extending down both sides of the a roof of the building;
    the enclosure including plural spaced columns forming opposed sidewalls and wind pivoting louvers supported above the columns;
    at least one paddle-wheel type wind turbine having a rotatable shaft which supports multiple radially spaced blades that when contacted by wind cause the shaft to rotate producing rotational work;
    the at least one paddle-wheel type wind turbine is mounted to and within the enclosure such that the shaft and blades are parallel to the longitudinal axis of the enclosure;
    a generator connected to the at least one paddle-wheel type wind turbine for converting the rotational work to electrical energy; and
    wherein the roof of the building, the opposed sidewalls and the wind pivoting louvers form airflow guides for capturing and directing wind into the blades of the at least one paddle-wheel type wind turbine before the wind reaches the roof ridge.

2. The wind energy harnessing system of claim 1, wherein the at least one paddle-wheel type wind turbine is formed of plural segments connected serially along the shaft and each segment includes two to seven blades attached around the shaft.

3. The wind energy harnessing system of claim 2, wherein the blades range in width from six inches to two feet creating a paddle having a diameter of between 1 and 4 feet.

4. The wind energy harnessing system of claim 1, wherein the airflow guides extend between one to two feet down the roof from the roof ridge.

5. The wind energy harnessing system of claim 1, wherein the airflow guides include ramps which direct the wind into the blades.

6. The wind energy harnessing system of claim 1, wherein the wind pivoting louvers are opened when the captured wind travels through the airflow guides and past the roof ridge.

* * * * *